United States Patent
Zeng et al.

(10) Patent No.: US 11,754,729 B2
(45) Date of Patent: Sep. 12, 2023

(54) NUCLEAR DETECTION SIMULATION DEVICE BASED ON NANOSECOND LIGHT SOURCE AND NUCLEAR SIGNAL INVERSION TECHNOLOGY

(71) Applicant: Chengdu University of Technology, Chengdu (CN)

(72) Inventors: Guoqiang Zeng, Chengdu (CN); Chuanhao Hu, Chengdu (CN); Qing Li, Chengdu (CN); Min Gu, Chengdu (CN); Xiaofeng Yang, Chengdu (CN); Shimin Hu, Chengdu (CN); Jian Yang, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 1 day.

(21) Appl. No.: 17/724,852

(22) Filed: Apr. 20, 2022

(65) Prior Publication Data
US 2023/0010244 A1    Jan. 12, 2023

(30) Foreign Application Priority Data
Jul. 12, 2021 (CN) .......................... 202110782284.4

(51) Int. Cl.
*G01T 1/20* (2006.01)

(52) U.S. Cl.
CPC ................. *G01T 1/20184* (2020.05)

(58) Field of Classification Search
CPC ............. G01T 1/20184; G01T 1/2018; G01T 1/20181; G01T 1/2019; G01T 7/005; G01T 1/40; G01J 3/28; G01J 3/0297
See application file for complete search history.

(56) References Cited

U.S. PATENT DOCUMENTS 10,132,942 B2 *  11/2018  Frisch ................... G01T 1/2985

FOREIGN PATENT DOCUMENTS

| CN | 103399221 A | 11/2013 |
|---|---|---|
| CN | 110336928 A | 10/2019 |

(Continued)

OTHER PUBLICATIONS

The State Intellectual Property Office of People's Republic of China; Application No. 202110782284.4; First Office Action; dated Mar. 24, 2022.

(Continued)

*Primary Examiner* — David P Porta
*Assistant Examiner* — Fani Polyzos Boosalis
(74) *Attorney, Agent, or Firm* — PARSONS BEHLE & LATIMER

(57) ABSTRACT

The present disclosure provides a nuclear detection simulation device based on a nanosecond light source and a nuclear signal inversion technology. Electronic circuits and nuclear pulse current signals are used to drive blue LEDs to emit nuclear pulse optical signals, so as to simulate a scintillator to receive γ radiation to emit light, and can simulate point sources and area sources, organic scintillator detectors and inorganic scintillators, scintillation efficiency and detection efficiency, radioactive sources, fast components and slow components, multi-type nuclear pulse signals, a statistical fluctuation phenomenon of nuclear pulses, the electron pair effect, the Compton effect, the photoelectric effect, and self-radiation of the scintillator, generate single or piled-up pulse signals, corresponding energy spectrum curves, and an environmental background spectral line. 3D visualization configuration and a nuclear signal detection process can be subjected to animated demonstration.

3 Claims, 15 Drawing Sheets

(56) References Cited

FOREIGN PATENT DOCUMENTS

| CN | 111553111 A | 8/2020 | |
|---|---|---|---|
| CN | 113625333 A | * 11/2021 | ............ G01J 3/0297 |

OTHER PUBLICATIONS

The State Intellectual Property Office of People's Republic of China; Application No. 202110782284.4; Second Office Action; dated Aug. 30, 2022.
Genghua, Zou, et al., "Virtual radiation source system based on FPGA" School of Physics and Technology, Wuhan University, Wuhan 430072, China; http://www.cnki.net Sep. 6, 2020.

* cited by examiner

NUCLEAR DETECTION SIMULATION DEVICE BASED ON NANOSECOND LIGHT SOURCE AND NUCLEAR SIGNAL INVERSION TECHNOLOGY

CROSS REFERENCE TO RELATED APPLICATION

This patent application claims the benefit and priority of Chinese Patent Application No. 202110782284.4, filed on Jul. 12, 2021, the disclosure of which is incorporated by reference herein in its entirety as part of the present application.

TECHNICAL FIELD

The present disclosure belongs to the technical field of nuclear pulse spectrometers, and in particular, relates to a nuclear detection simulation device based on a nanosecond light source and a nuclear signal inversion technology.

BACKGROUND ART

The nuclear pulse spectrometer can be used in system development, teaching experiments in the nuclear field, and teaching experiments in the fields of radioactivity. If radioactive sources and detectors are purchased directly, the radioactive sources produce ionizing radiation and threaten human life due to strong radioactivity. Therefore, certain radiation protection measures must be taken during experimental teaching, which increases a lot of capital costs and reduces the teaching effect. In order to solve the above problems, it is necessary to develop a nuclear pulse generator system.

At present, there are generally two approaches for mainstream nuclear signal generators: the first one: the field programmable gate array (FPGA) generates a series of random nuclear pulse digital signals with Gaussian amplitude distribution according to a mathematical algorithm, and the digital-to-analog converter (DAC) converts the digital signals into simulated nuclear pulse signals. Such implementation method is very complex and inefficient in algorithm design. The second is to use the advanced reduced instruction set computer (RISC) machine (ARM) instead of the FPGA to realize the output of the nuclear pulse signals, and the obvious disadvantage of this method is that the running rate is very low, and the demand for high-bandwidth output cannot be achieved.

Moreover, the use of the nuclear pulse signal generator is also quite cumbersome, which can only be used through quite complex parameter settings, so it is extremely unfriendly to non-professionals. In addition, the traditional nuclear pulse signal generator has a single function, just as a signal generating unit. There are certain thresholds for the existence of teaching experiments.

SUMMARY

The present disclosure provides a nuclear detection simulation device based on a nanosecond light source to solve the deficiencies of the prior art.

To achieve the above objective, the present disclosure adopts the following technical solutions:

A nuclear detection simulation device based on a nanosecond light source includes an upper computer, field-programmable gate array (FPGA) system-on-chip (SoC) processor, a synchronous clock, a double data rate type 3 (DDR3), a secure digital (SD) card (TF-CARD), a liquid crystal display (LCD) screen, and an output channel for a simulated nuclear pulse signal. The upper computer is connected to the FPGA SoC processor through a 1000 M Ethernet, a USB3.0, and a RS232 respectively. The synchronous clock, the DDR3, and the SD card are respectively connected to the FPGA SoC processor, and the FPGA SoC processor is connected to the output channel for the simulated nuclear pulse signal.

As a further elaboration of the above technical solution: the FPGA SoC processor may include an FPGA unit and an ARM unit, and the FPGA unit may be connected to the ARM unit through an AXI bus.

As a further elaboration of the above technical solution: the LCD screen may be directly connected to the FPGA unit of the FPGA SoC processor through an IO port.

As a further elaboration of the above technical solution: the SD card may be connected to the ARM unit of the FPGA SoC processor.

As a further elaboration of the above technical solution: the synchronous clock may be connected to the FPGA unit and the ARM unit of the FPGA SoC processor synchronously to provide the synchronous clock for the FPGA unit and the ARM unit.

As a further elaboration of the above technical solution: the output channel for the simulated nuclear pulse signal may include a DAC, a current amplifier, a light emitting diode (LED), an optical filter, a photomultiplier tube (PMT), and a high-voltage divider tube seat. The DDR3 may be connected to the ARM unit of the FPGA. An input pin of the DAC may be connected in parallel to the FPGA unit of the FPGA through an IO port. The current amplifier may be connected to an output pin of the DAC. The LED may be connected to an output pin of the current amplifier. The LED may be closely attached to the optical filter. The optical filter may be directly attached to a light-receiving surface of the PMT. The PMT may be connected to the high-voltage divider tube socket (preamplifier).

As a further elaboration of the above technical solution: the nuclear detection simulation device may further include a power supply. The power supply may be respectively connected to the upper computer, the FPGA SoC processor, the synchronous clock, the DDR3, the SD card, the LCD screen, and the output channel for the simulated nuclear pulse signal.

A nuclear signal inversion technology of a nuclear detection simulation device based on a nanosecond light source includes the following steps:

(1) setting, by an upper computer, corresponding parameters according to user-selected functions, then generating an energy spectrum curve with a corresponding statistical fluctuation phenomenon using Monte Carlo simulation and a large amount of real data according to the parameters, and performing animated demonstration of a detection process of a scintillator detector and a spectrometer to a radioactive source;

(2) sending, by the upper computer, a spectral line and the set parameters to a FPGA SoC processor, or pre-storing the spectral line in a SD card;

(3) inverting, by an ARM unit of the FPGA SoC processor, the spectral line into amplitude information of a series of random nuclear pulse signals; or when simulation of the radioactive source is selected, directly generating, by the FPGA SoC processor, amplitude information of a series of random nuclear pulse conforming to characteristics of the radioactive source;

(4) determining, by the ARM unit of the FPGA SoC processor, whether fast components and slow components are contained, and whether the self-radiation and the electron pair effect are generated according to a type of a scintillator, and generating a series of random nuclear pulse signal sequence data containing different rise times, fall times, and amplitudes according to a calculated proportional relationship of the contained fast components and slow components and self-radiated nuclear pulse signals combined with the amplitude information of the random nuclear pulse;

(5) sending, by the ARM unit of the FPGA SoC processor, data to an FPGA unit;

(6) generating, by the FPGA unit, a uniform random number according to the data, and then generating an exponentially distributed random number according to the uniform random number as an output time interval of each nuclear pulse signal;

(6) adjusting the output time interval according to scintillation efficiency and detection efficiency of the scintillator detector;

(7) since the FPGA unit is equipped with a counter, when a value of the counter is equal to the time interval, outputting nuclear pulse digital signals sequentially according to a nuclear pulse signal sequence, and when the time interval is less than a pulse width of the nuclear pulse signals, outputting piled-up nuclear pulse signals, where up to tenfold pileup is capable of being achieved; and (8) converting the nuclear pulse digital signals into simulated nuclear pulse signals through a DAC, then amplifying the simulated nuclear pulse signals through a current amplifier to drive an LED to output nuclear pulse optical signals, illuminating a PMT by the optical signals after attenuation by an optical filter, converting the optical signals into electrical signals by the PMT, and then outputting the electrical signals from an anode.

As a further elaboration of the above technical solution: in step (1), the animated demonstration may include a process of generating fluorescent photons after γ rays are absorbed by the scintillator detector, a process of converting the fluorescent photons into electrical signals by the PMT and performing multi-stage amplification, signal changes after passing through a preamplifier, and a process of how a spectrometer extracts information contained in the signal output by the preamplifier.

As a further elaboration of the above technical solution: in step (1), the user-selected functions may include simulation of the type of the scintillator, simulation of relative positions of the radioactive source and the detector, simulation of the intensity of the radioactive source, simulation of the type of the point or area source radioactive source, simulation of the activity of the radioactive source, simulation of the photoelectric effect, simulation of Compton scattering, simulation of the electron pair effect, simulation of the scintillation efficiency of the scintillator, simulation of the detection efficiency of the scintillator detector, simulation of an environmental background, simulated output of full-energy peaks, single escape peaks, and double escape peaks, simulation of the nuclear pulse signal of the fast components and slow components output in the scintillator detector, simulated output of nuclear pulse signals containing various rise times, fall times, and amplitudes, and simulation of the statistical fluctuation phenomenon after the rays are absorbed by the detector and the nuclear pulse signal is output.

The present disclosure has the following beneficial effects:

The present disclosure provides a nuclear pulse signal generator based on a FPGA SoC processor. The FPGA SoC processor is divided into two units of dual-core ARM and FPGA logic resources. Therefore, in the present disclosure, the inversion of the spectral line, the generation of the uniform random number, and the generation of the Gaussian random number are processed by the ARM unit of the FPGA, while the generation of the uniform random number, the exponentially distributed random number, and the random nuclear pulse signals are placed in the FPGA unit of the FPGA for processing. The two parts use the synchronous clock as the clock source and are transmitted at a high speed through the AXI bus, such that algorithm processing is realized in parallel, efficiently and quickly, which overcomes the disadvantage of complex algorithm implementation logic caused by the fact that all algorithms of the traditional nuclear pulse signal generator are implemented by the FPGA unit, and the disadvantage of a low running rate caused by the fact that some algorithms are all implemented by the ARM unit.

The present disclosure uses a large amount of real radioactive source measurement data and Monte Carlo simulation data for processing to obtain the energy spectrum curves detected by different detectors under the environment of a single radioactive source or multiple radioactive sources, and the obtained energy spectrum curve is more real and reliable. It overcomes the defect that the traditional nuclear pulse signal generator can only calculate the energy spectrum curve under a certain radioactive source environment through a empirical mathematical formula, or directly simulate the energy spectrum curve through Monte Carlo but cannot simulate the environmental background.

The present disclosure uses the output of the linear shift register (LFSR) or the output of the cellular automaton, and the obtained result is output as the final uniform random number. In addition, 32-level registers are used, and the sequence period is 232-1, so as to simulate the true random number as much as possible. The generated uniform random number is used as a data query address of an exponentially distributed probability table, thereby generating the exponentially distributed random number.

The present disclosure designs and realizes the direct inversion of the energy spectrum curve data into the amplitude information of the random nuclear pulse signal.

The present disclosure can generate different energy spectrum curves through the parameters such as the type, position, and activity of radioactive sources set by the user, so as to simulate and realize the generation of nuclear pulse signals under the environment of different types, positions, and activities of radioactive sources. It can realize the function of changing the size and type of the scintillator, so it can be used in many occasions and conditions. It overcomes the defects of single performance and single application of the traditional nuclear pulse signal generator.

The present disclosure realizes the SD card storage function, which can pre-store the spectral line data in the SD card. Therefore, the nuclear pulse annunciator can read the corresponding data according to the parameters set by the user under the off-line condition, so as to realize the nuclear pulse output function under the off-line condition.

The present disclosure realizes the state of simulated signal pileup, designs ten groups of signal generation modules, and uses the method of instantiating the signal generation module. When pulse pileup occurs, the pulse flow is shunted to the signal generation module, the ten-channel signal generation module works in a triggered manner, and its output signal enters the adder for superposition, and is finally output.

The present disclosure replaces the original scintillator with an LED lamp to replace the scintillator to receive γ radiation and emit fluorescent photons, which greatly retains the integrity of the detector.

The present disclosure can realize multi-functional simulation, such as the scintillator receiving γ radiation to emit fluorescent photons. The system can realize the simulation of the detection process of the point source and the area source, can simulate the detection process of organic scintillator detectors and inorganic scintillator detectors, can simulate different scintillation efficiencies and detection efficiencies of different scintillator detectors, simulates the output of the nuclear pulse signal according to the process of radioactive sources being detected, simulates the nuclear pulse signal of the fast components and slow components output in the scintillator detector, can output the nuclear pulse signals containing various rise times, fall times, and amplitudes, simulates the statistical fluctuation phenomenon after the rays are absorbed by the detector and the nuclear pulse signal is output, can also simulate the output of full-energy peaks, single escape peaks, and double escape peaks, can simulate the Compton scattering of the scintillator detector, can simulate the nuclear pulse signal generated by the self-radiation of the scintillator detector, can generate the corresponding energy spectrum curve according to parameters such as the type of the scintillator, the position of the radioactive source, the intensity of the radioactive source, and the type of the radioactive source and invert the output of the nuclear pulse signal, can realize the output of the nuclear pulse signal with up to tenfold pileup, and realizes the generation of Gaussian random numbers, uniform random numbers, and exponentially distributed random numbers in the FPGA. The upper computer can generate the spectral line according to a large amount of experimental data and Monte Carlo simulation, and can simulate and configure the output of various environmental background spectral lines, and realize 3D visualization in the operation process.

The present disclosure uses functions such as animated demonstration for the whole equipment and operation on the upper computer. The user can operate the device by inputting parameters and dragging the mouse. The whole operation is easy to understand and intuitive, which overcomes the problem that the traditional nuclear pulse signal generator can only operate by setting complex, diverse, and obscure parameters. The nuclear pulse signal generator is no longer an equipment tool that can only be operated by professionals, but also a teaching instrument suitable for students' teaching.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art on the basis of the embodiments of the present disclosure without creative efforts shall fall within the protection scope of the present disclosure.

Figure 1:
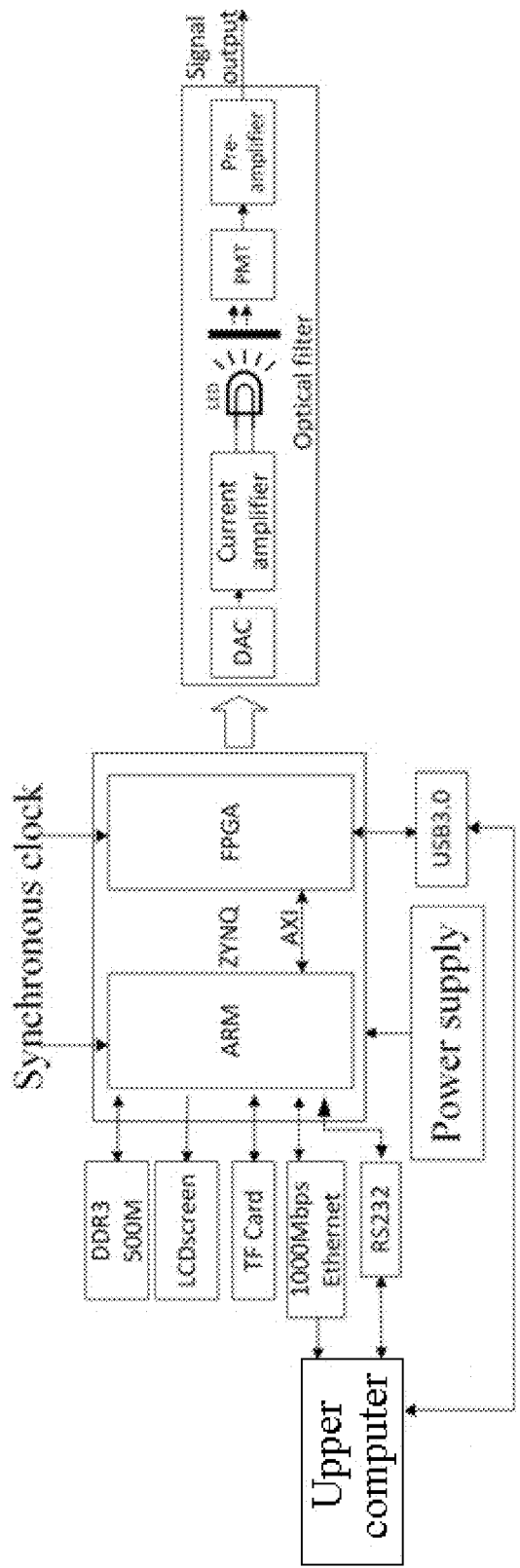
FIG. 1 is a schematic structural diagram of a nuclear detection simulation device based on a nanosecond light source provided by the present disclosure.
Figure 2:
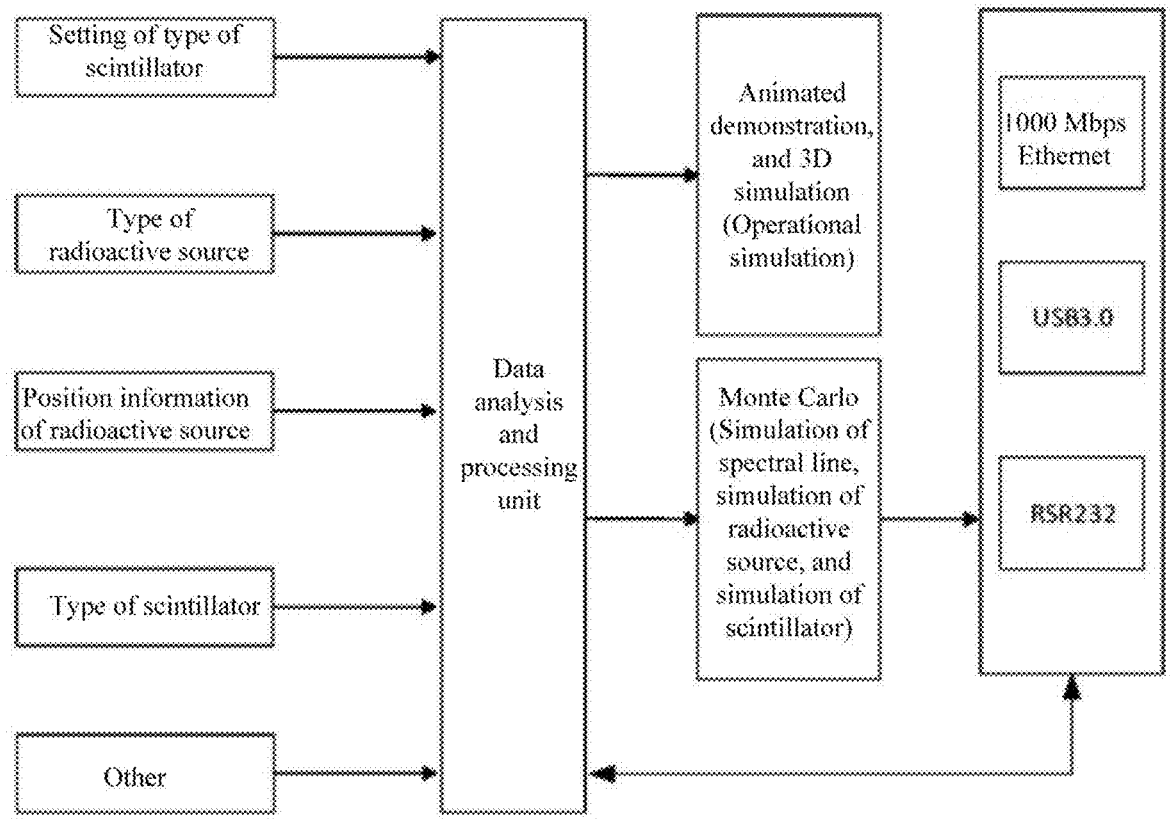
FIG. 2 is a block diagram of a software program.
Figure 3:
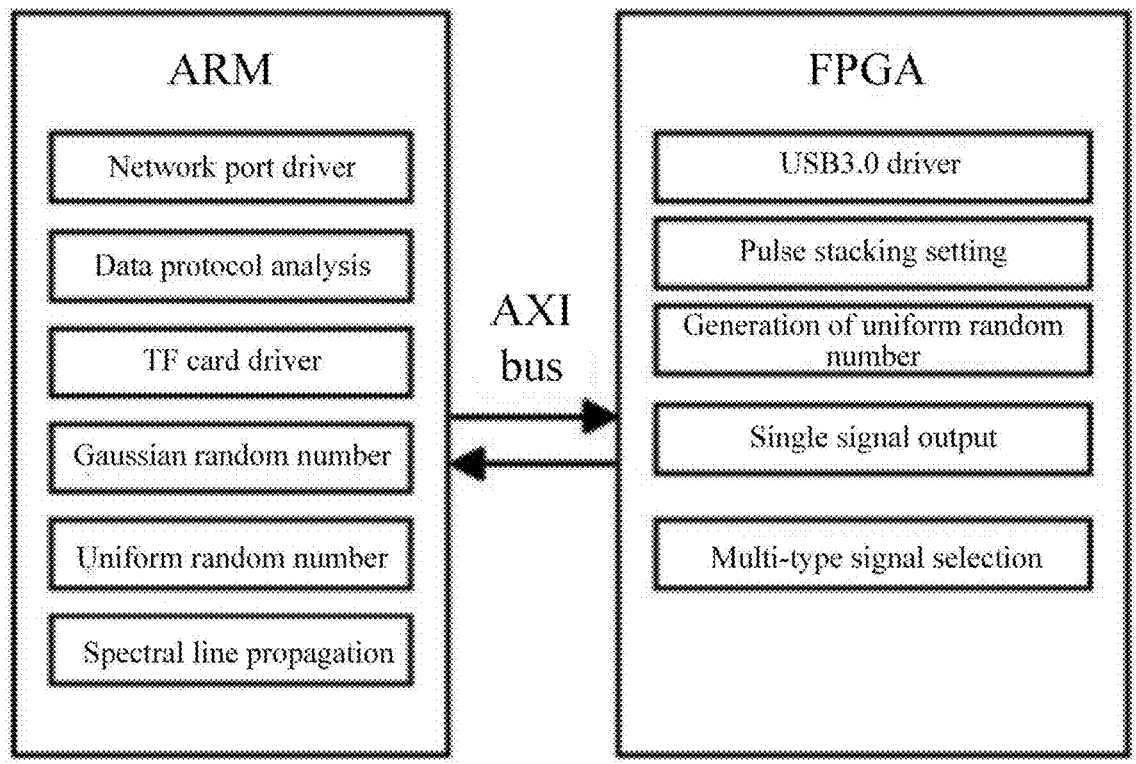
FIG. 3 is a functional block diagram of a system program.

As shown in FIG. 1, a nuclear detection simulation device based on a nanosecond light source includes an upper computer, a FPGA SoC processor, a synchronous clock, a DDR3, a SD card (TF-CARD), a LCD screen, and an output channel for a simulated nuclear pulse signal.

In the present embodiment, the upper computer is connected to the FPGA SoC processor through a 1000 M Ethernet, a USB3.0, and a RS232 respectively. The synchronous clock, the DDR3, and the SD card are respectively connected to the FPGA SoC processor, and the FPGA SoC processor is connected to the output channel for the simulated nuclear pulse signal. The FPGA SoC processor includes an FPGA unit and an ARM unit, and the FPGA unit is connected to the ARM unit through an AXI bus. The LCD screen is directly connected to the FPGA unit of the FPGA SoC processor through an 10 port. The SD card is connected to the ARM unit of the FPGA SoC processor. The synchronous clock is connected to the FPGA unit and the ARM unit of the FPGA SoC processor synchronously to provide the synchronous clock for the FPGA unit and the ARM unit. The output channel for the simulated nuclear pulse signal includes a DAC, a current amplifier, an LED, an optical filter, a PMT, and a high-voltage divider tube seat. The DDR3 is connected to the ARM unit of the FPGA. An input pin of the DAC is connected in parallel to the FPGA unit of the FPGA through an IO port. The current amplifier is connected to an output pin of the DAC. The LED is connected to an output pin of the current amplifier. The LED is closely attached to the optical filter. The optical filter is directly attached to a light-receiving surface of the PMT. The PMT is connected to the high-voltage divider tube socket (preamplifier).

In the present embodiment, the nuclear detection simulation device further includes a power supply. The power supply is respectively connected to the upper computer, the FPGA SoC processor, the synchronous clock, the DDR3, the SD card, the LCD screen, and the output channel for the simulated nuclear pulse signal, that is, the power supply powers the whole nuclear detection simulation device.

The upper computer generates corresponding energy spectrum curves according to the parameters such as the type of the scintillator, and the position, intensity, and type of the radioactive sources, and can perform animated demonstration of the detection process of the detector to the radioactive source. The demonstration part includes a process of generating fluorescent photons after γ rays are absorbed by the scintillator detector, a process of converting the fluorescent photons into electrical signals by the PMT and performing multi-stage amplification, signal changes after passing through a preamplifier, and a process of how a spectrometer extracts information contained in the signal output by the preamplifier. The upper computer sends the spectral line to the FPGA processor, or pre-stores the spectral line in the SD card.

The LCD screen displays the system parameters set by the upper computer in real time. The ARM unit of the FPGA processor inverts the spectral line into amplitude information of a series of random nuclear pulse signals. The ARM can also directly generate the amplitude information of the nuclear pulse signals according to different parameters, and then send it to the FPGA unit of the FPGA through the AXI bus. The FPGA unit reads the nuclear pulse signal from the corresponding ROM according to the selected type of the scintillator and then multiplies the amplitude information to obtain a complete nuclear pulse digital signal. The FPGA unit generates uniform random numbers, and the uniform random numbers generate negative exponentially distributed random numbers through mathematical operation algorithms, and the negative exponentially distributed random numbers are used as the time interval for the output of the nuclear pulse signal. Since the FPGA unit is equipped with a counter, when a value of the counter is equal to the time interval, a complete nuclear pulse digital signal is output, and here, when the time interval is less than a pulse width of the nuclear pulse signals, signal pileup will occur. The present disclosure supports up to tenfold signal pileup. This digital signal is converted into a simulated nuclear pulse signal through a DAC, then the simulated nuclear pulse signal is amplified through a current amplifier to drive an LED to output nuclear pulse optical signals, a PMT is illuminated by the optical signals after attenuation by an optical filter, the optical signals are converted into electrical signals by the PMT, and then the electrical signals are output from an anode.

A nuclear signal inversion technology of a nuclear detection simulation device based on a nanosecond light source include the following steps.

(1) An upper computer sets corresponding parameters according to user-selected functions, then generates an energy spectrum curve with a corresponding statistical fluctuation phenomenon using Monte Carlo simulation and a large amount of real data according to the parameters, and performs animated demonstration of a detection process of a scintillator detector and a spectrometer to a radioactive source.

(2) The upper computer sends a spectral line and the set parameters to a FPGA SoC processor, or pre-stores the spectral line in a SD card.

(3) An ARM unit of the FPGA SoC processor inverts the spectral line into amplitude information of a series of random nuclear pulse signals; or when simulation of the radioactive source is selected, the FPGA SoC processor directly generates amplitude information of a series of random nuclear pulse conforming to characteristics of the radioactive source.

(4) The ARM unit of the FPGA SoC processor determines whether fast components and slow components are contained, and whether the self-radiation and the electron pair effect are generated according to a type of a scintillator, and generates a series of random nuclear pulse signal sequence data containing different rise times, fall times, and amplitudes according to a calculated proportional relationship of the contained fast components and slow components and self-radiated nuclear pulse signals combined with the amplitude information of the random nuclear pulse.

(5) The ARM unit of the FPGA SoC processor sends data to an FPGA unit.

(6) The FPGA unit generates a uniform random number according to the data, and then generates an exponentially distributed random number according to the uniform random number as an output time interval of each nuclear pulse signal.

(6) The output time interval is adjusted according to scintillation efficiency and detection efficiency of the scintillator detector.

(7) Since the FPGA unit is equipped with a counter, when a value of the counter is equal to the time interval, nuclear pulse digital signals are output sequentially according to a nuclear pulse signal sequence, and when the time interval is less than a pulse width of the nuclear pulse signals, piled-up nuclear pulse signals are output. Up to tenfold pileup is capable of being achieved.

(8) The nuclear pulse digital signals are converted into simulated nuclear pulse signals through a DAC, then the simulated nuclear pulse signals are amplified through a current amplifier to drive an LED to output nuclear pulse optical signals, a PMT is illuminated by the optical signals after attenuation by an optical filter, the optical signals are converted into electrical signals by the PMT, and then the electrical signals are output from an anode.

In step (1), the animated demonstration includes a process of generating fluorescent photons after γ rays are absorbed by the scintillator detector, a process of converting the fluorescent photons into electrical signals by the PMT and performing multi-stage amplification, signal changes after passing through a preamplifier, and a process of how a spectrometer extracts information contained in the signal output by the preamplifier.

In step (1), the user-selected functions includes simulation of the type of the scintillator, simulation of relative positions of the radioactive source and the detector, simulation of the intensity of the radioactive source, simulation of the type of the point or area source radioactive source, simulation of the activity of the radioactive source, simulation of the photoelectric effect, simulation of Compton scattering, simulation of the electron pair effect, simulation of the scintillation efficiency of the scintillator, simulation of the detection efficiency of the scintillator detector, simulation of an environmental background, simulated output of full-energy peaks, single escape peaks, and double escape peaks, simulation of the nuclear pulse signal of the fast components and slow components output in the scintillator detector, simulated output of nuclear pulse signals containing various rise times, fall times, and amplitudes, and simulation of the statistical fluctuation phenomenon after the rays are absorbed by the detector and the nuclear pulse signal is output.

Specific Embodiment (1) Program Design of Upper Computer System

Figure 13:
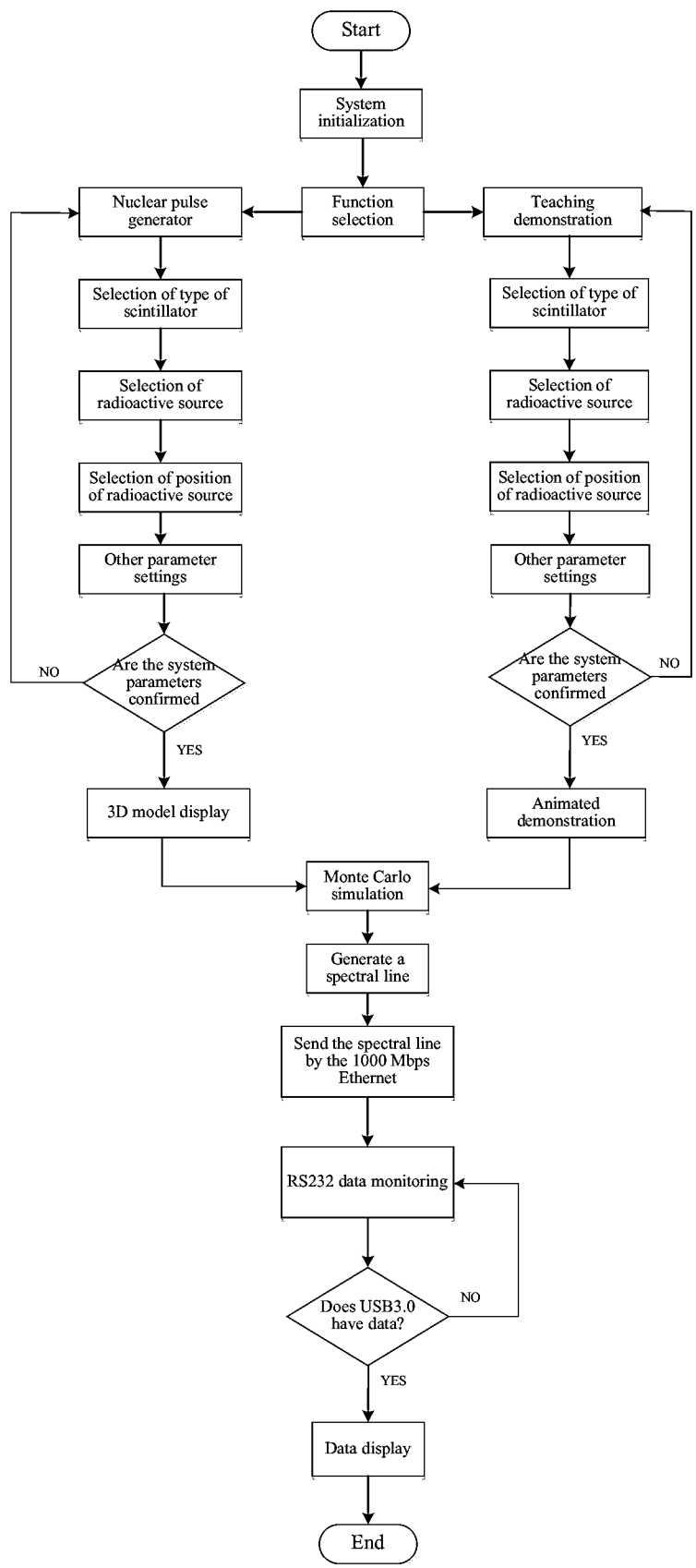
FIG. 13 is a flow chart of an upper computer program.

The upper computer of the present disclosure can realize the simulation of any radioactive source, any energy spectrum, the same source in different positions and directions, and the luminous characteristics of different types of scintillators. The block diagram is shown in FIG. 13.

At present, most nuclear pulse signal generators generate random numbers whose amplitudes conform to Gaussian distribution and exponential distribution in time, and then output nuclear pulse signals. This method can simulate the random characteristics of pulse amplitude and the random characteristics of adjacent pulse time intervals for nuclear signals with typical energy distribution and arbitrary energy distribution. However, it is impossible to simulate the Compton phenomenon in which incident photons are scattered due to inelastic collisions with extranuclear electrons in matter atoms. During collision, the incident photons transfer part of the energy to the electron, making it separate from the atom to become a recoil electron, and the energy and motion direction of the scattered photon change. The scattered photon count measured by the detector at different angles is not only related to the Compton scattering differential cross section at that time, but also related to the solid angle of the opening of the detector to the central scattering sample and the intrinsic detection efficiency of the detector to the incident y-ray. Therefore, traditional empirical formulas cannot solve such problems. However, the present disclosure uses the Monte Carlo method to simulate the radioactive source and the energy spectrum of any energy.

Since the position and direction of the radioactive source relative to the detector will have a great impact on the detection of the sum signal, the upper computer of the present disclosure can also simulate the position and direction of the radioactive source relative to the scintillator through the Monte Carlo method. In addition, the present disclosure can also simulate different scintillators and different sizes of scintillators according to the luminous characteristics of different scintillators, and realize the visual operation on the upper computer through 3D simulation technology and animated demonstration, such that users can experience the whole physics operation process more conveniently and intuitively, so as to meet the application research of many occasions.

(2) Program Design of Lower Computer System

Figure 4:
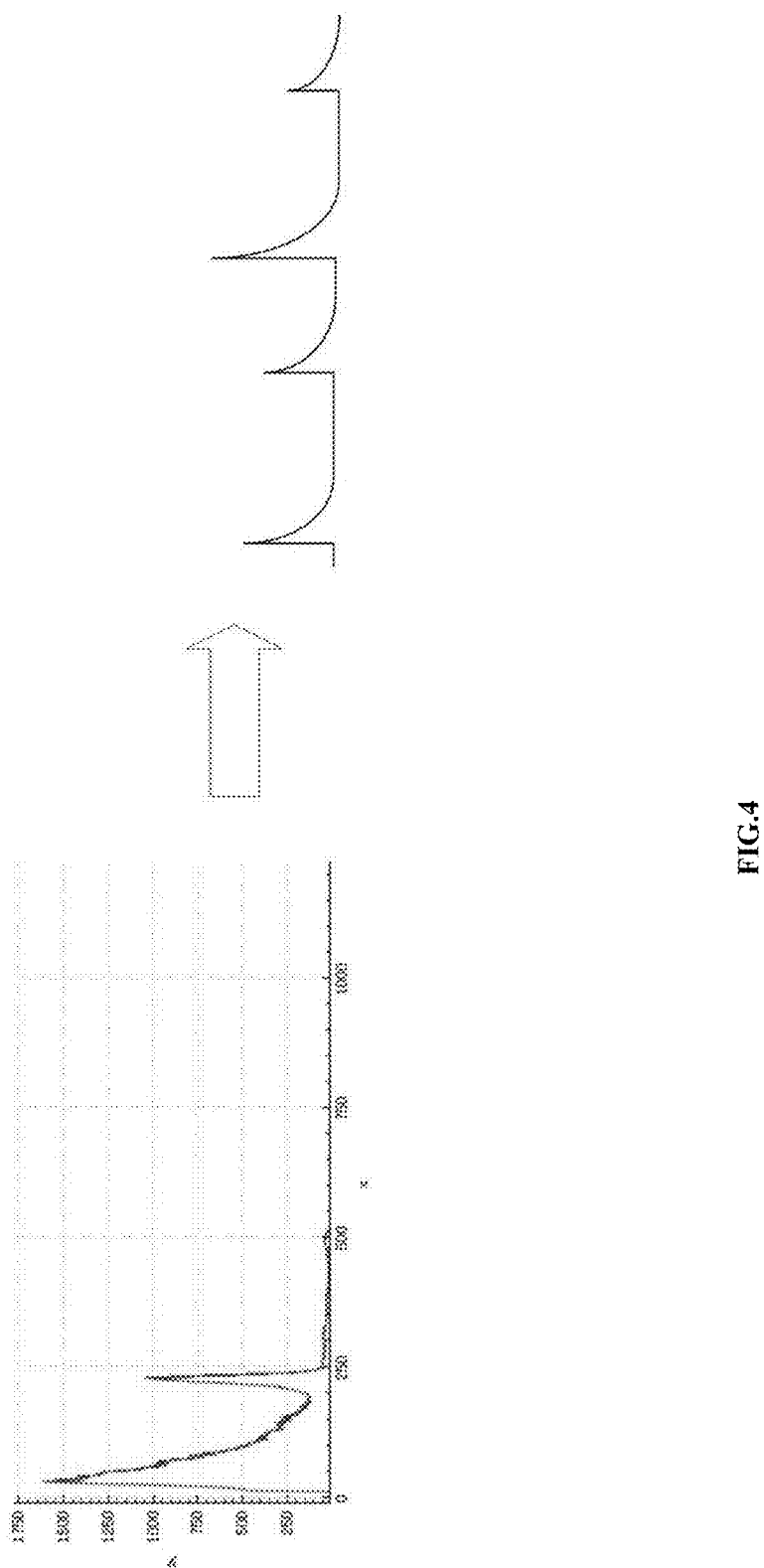
FIG. 4 is an implementation diagram of a function target of a lower computer.
Figure 14:
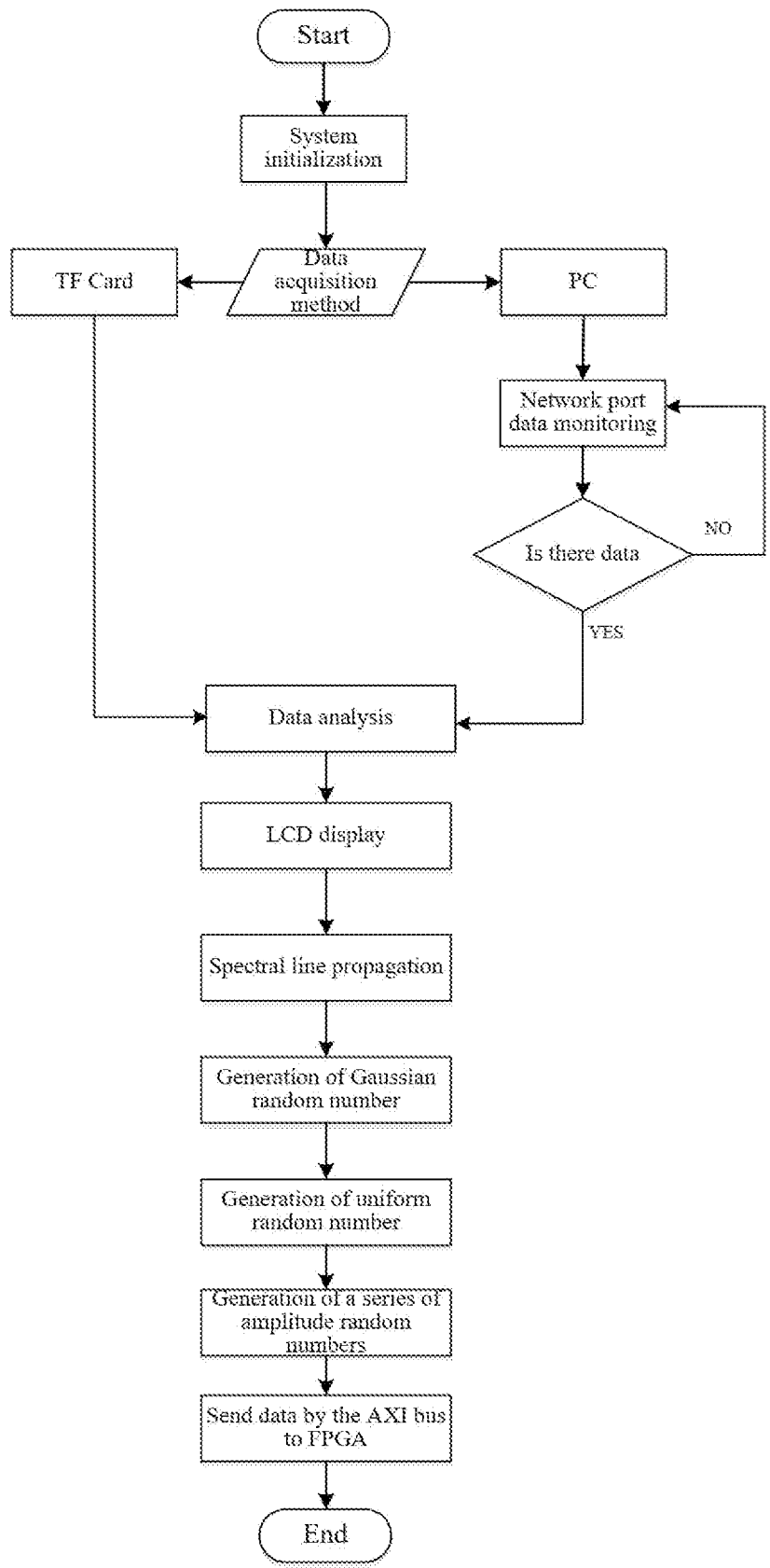
FIG. 14 is a flow chart of ARM.

The lower computer realizes the functions of nuclear pulse signal output and energy spectrum inversion of different types of scintillator with luminous characteristics. Since the attenuation of the radioactive source is random, and the time interval between the two pulse signals varies according to the location and activity of the radioactive source, and the type and size of the scintillator. Therefore, in the present disclosure, in order to realize the functions of the type, position, and activity of the simulated source, and the size of the scintillator, the lower computer has corresponding random amplitude information and time interval information conforming to the exponential distribution according to the parameters of the upper computer. Since different types of scintillators have different luminous characteristics, the time information for generating nuclear pulse signals is different, so the present disclosure can generate nuclear pulse signals conforming to the characteristics of scintillators according to different types of scintillators. A functional block diagram of the system program is shown in FIG. 14, which includes software algorithm functions, operation drivers of each module, and each program unit is implemented in ARM and FPGA respectively. AXI bus is used for communication between ARM and FPGA. The function to be realized by the lower computer is shown in FIG. 4, that is, to calculate the spectral line as a series of random nuclear pulse signals.

1. Realization of Spectral Line Inversion

In order to be suitable for simulating any radioactive source, the user can arbitrarily edit the information of the radioactive source, such as the position, intensity, direction, and type of the radioactive source, and then generate the corresponding energy spectrum curve. Then, according to the energy spectrum curve edited by the user, a series of random data conforming to the characteristics of the curve are generated as the amplitude information of the nuclear pulse signal.

Figure 5:
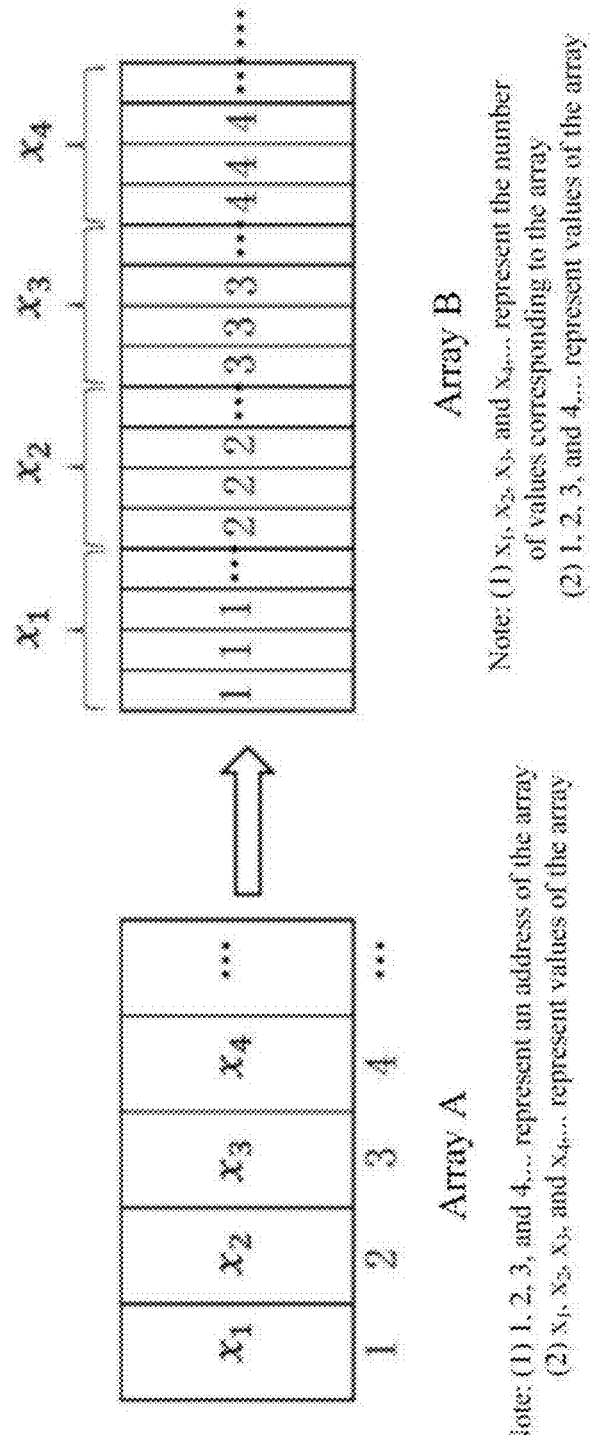
FIG. 5 is a schematic diagram of a spectral line inversion process.

The ARM obtains the energy spectrum curve edited by the user through the Gigabit Ethernet port or SD card, and stores it in the array A. The value of the array A represents the count rate of the corresponding energy, and the address represents the energy, that is, the energy spectrum address. The inversion of the energy spectrum curve is to convert the array A into the array B, as shown in FIG. 5.

Inversion process: the address of the array A is converted into the value of the array B, the number of which is equal to the value of the array A. Then, a uniform random number is generated as the address of the array B and the corresponding value is read out, and then multiplied by a specific coefficient to obtain a random nuclear pulse signal amplitude value X.

2. Generation of Uniform Random Number

Figure 6:
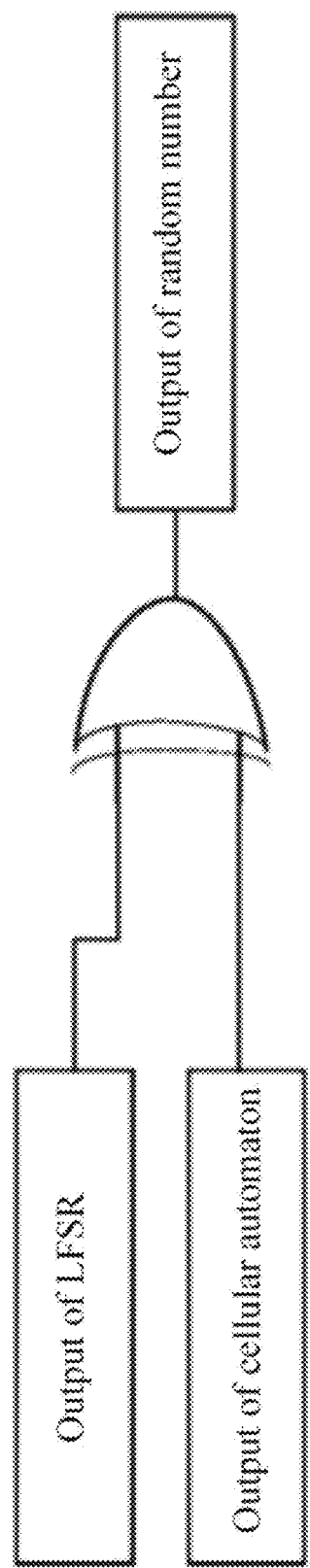
FIG. 6 is a schematic diagram of output of a uniform random number.

Since the decay process of the actual radioactive source is random, and the uniform distribution can obtain exponential distribution and Gaussian distribution through corresponding transformation, it is necessary to generate a uniform random number first. The present disclosure uses the output of the LFSR or the output of the cellular automaton, and the obtained result is output as the final uniform random number, as shown in FIG. 6.

Figure 7:
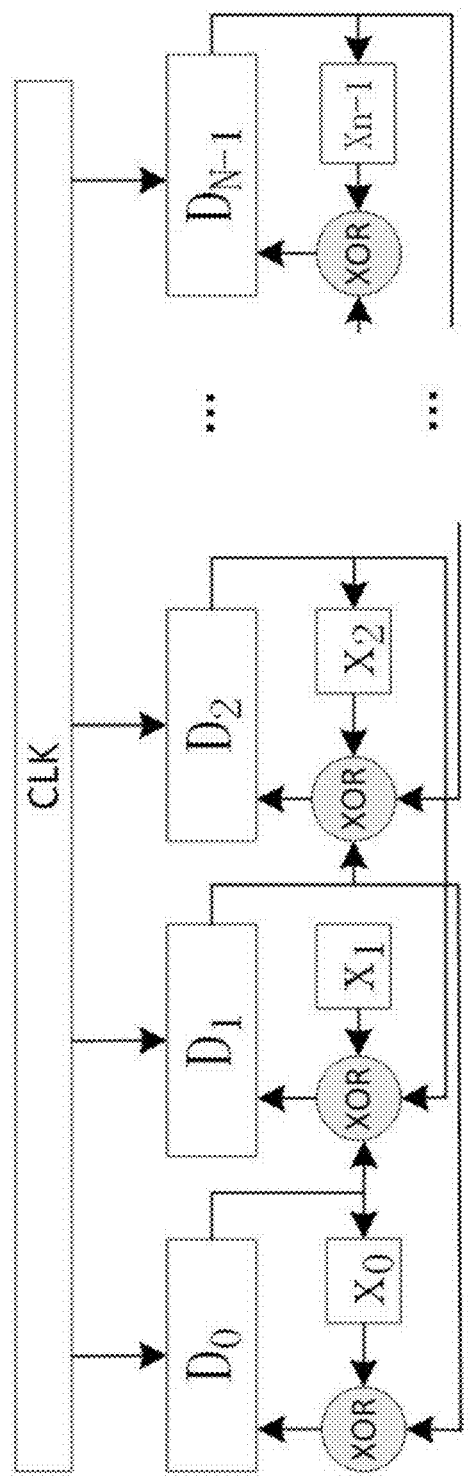
FIG. 7 is a structural diagram of a 90/150 cellular automaton.

Since the random sequence period of the cellular automaton is limited, in order to simulate the true random number as much as possible, a long-period sequence can be driven by the FPGA high-speed clock. The present disclosure uses 32-level registers, and the sequence period is 232-1. In order to increase the disorder of the uniformly distributed sequence, the present disclosure uses the way of LFSR truncation output or 90/150 linear cellular automaton output to obtain the final result. FIG. 7 is a structural diagram of a 90/150 cellular automaton.

Both linear feedback shift registers and cellular automaton are special forms of linear finite state machines. Broadly speaking, cellular automaton can be regarded as an extension of feedback shift registers. In this paper, a 32-order 90/150 zero-boundary additive cell state machine is used, and its corresponding characteristic polynomial is:

$$f(x) = x32 + x28 + x27 + \ldots + 1 \qquad (1\text{-}1).$$

3. Generation of Random Nuclear Pulse Signals

Figure 8:
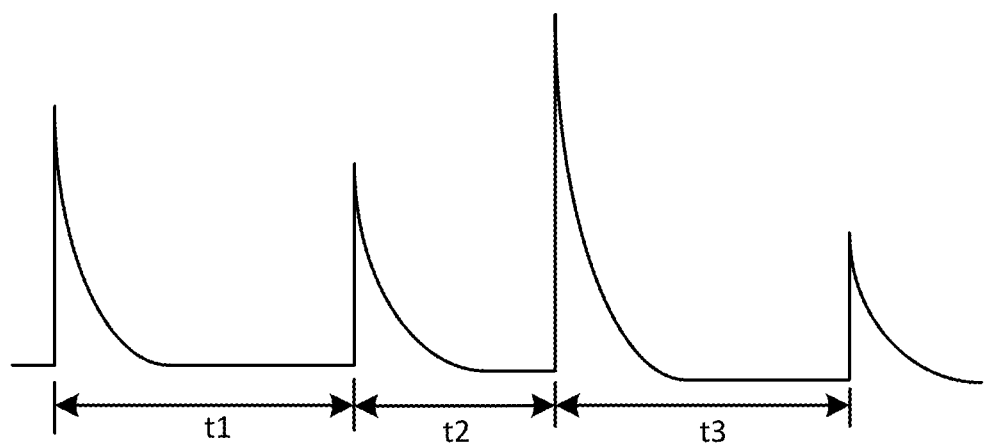
FIG. 8 is an exponential distribution diagram of probability.

Since the decay process of the actual radioactive source is random, and the time interval approximately exhibits exponential distribution, as shown in FIG. 8. The values of the time intervals t1 and t2, t3 are random and the probability is exponentially distributed.

Therefore, one of the key techniques is to design and generate random numbers with negative exponential distribution as the time interval between two nuclear pulse signals.

The present disclosure generates exponentially distributed random numbers inside the FPGA. The exponentially distributed probability table is first stored in the ROM of the FPGA, and then as described in (2), the output of the LFSR or the output of the cellular automaton is used first, and the obtained result is output as the final uniform random number. This random number is then used as the address of the probability table, and the values in it are read out in turn to obtain a random time series with negative exponential distribution.

In the present disclosure, a counter with a 400 M clock is also set inside the FPGA. When the count value is equal to the time series value, a trigger signal is generated. When the trigger signal at random time interval is received, the nuclear pulse signal is read from the ROM and multiplied by the amplitude value X, and then output to generate random nuclear pulse signals.

4. Realization of Nuclear Pulse Pileup

Figure 9:
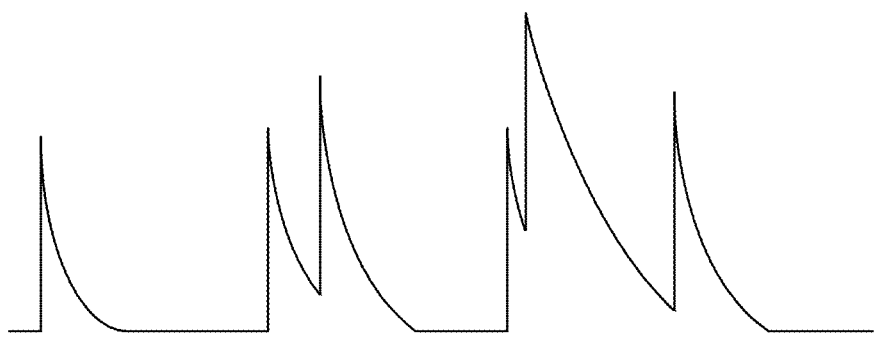
FIG. 9 is a schematic diagram of a pileup phenomenon.
Figure 10:
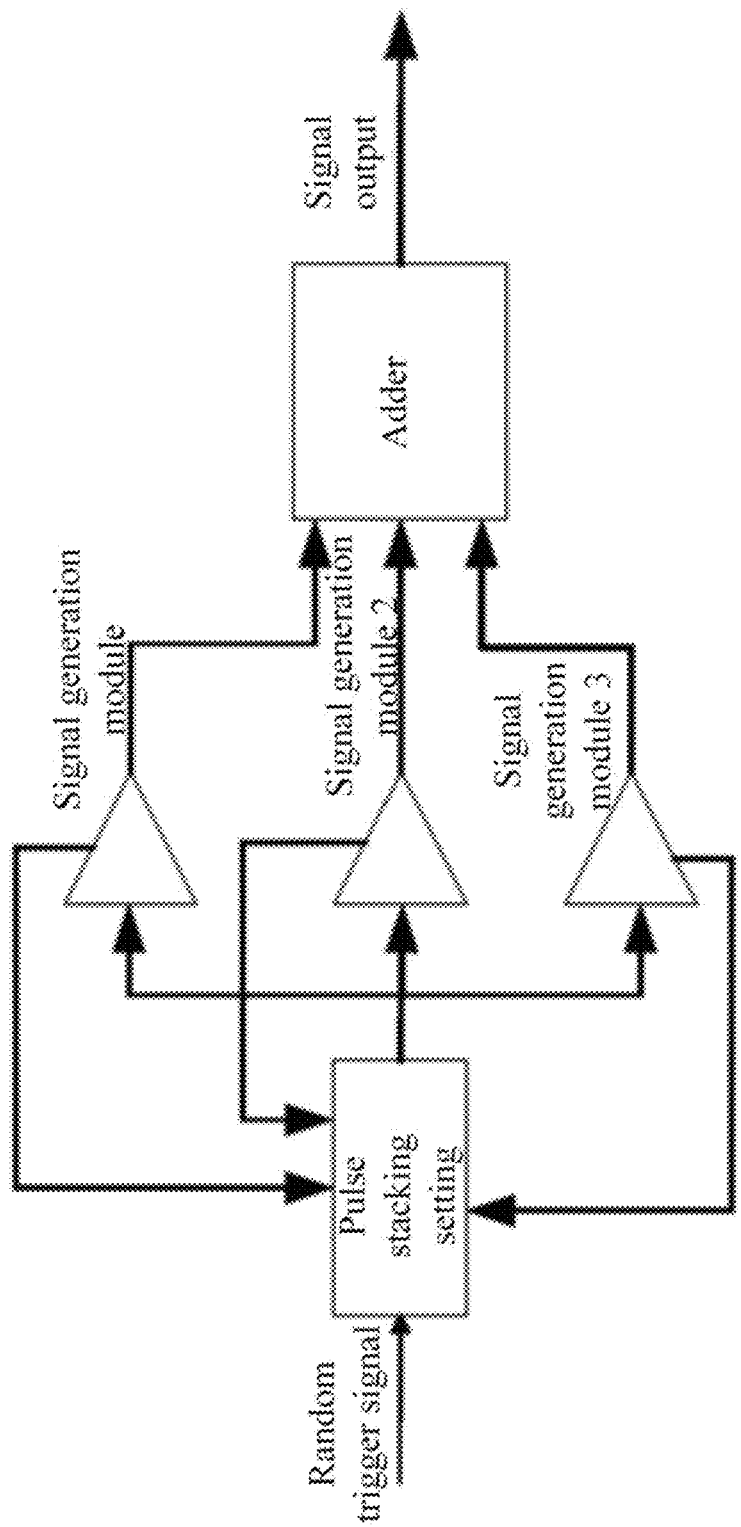
FIG. 10 is a schematic diagram of a principle of pulse pileup.

Since the decay process of the actual radioactive source is random, pileup will occur when the time interval between two random pulses is less than the pulse width of the nuclear pulse signal, as shown in FIG. 9. In order to simulate the pileup situation, the present disclosure designs ten groups of signal generation modules, and uses the method of instantiating the signal generation module. When pulse pileup occurs, the pulse flow is shunted to the signal generation module, the ten-channel signal generation module works in a triggering manner, and its output signal enters the adder for superposition, and is finally output to the DAC. Here, a three-channel signal generation module is taken as an example, as shown in FIG. 9. Its structure is simple and the effect is remarkable, as shown in FIG. 10.

5. Method for Simulating Multiple Detectors

Since different scintillator detectors have different luminous characteristics, the nuclear pulse signals generated by different detectors have certain differences. For example, the nuclear pulse signals generated by NaI scintillator detectors have a longer rise time than that of the lanthanum bromide detectors, and the NaI scintillator detectors have different energy resolution and detection efficiency from the lanthanum bromide detectors. Therefore, according to these parameters, the present disclosure first pre-stores various nuclear pulse signals including detector characteristic parameters in the ROM of the FPGA. When a nuclear pulse signal needs to be generated, the corresponding nuclear pulse signal can be output according to the detector type selected by the user.

6. Structure Design of LED Light Source

Figure 11:
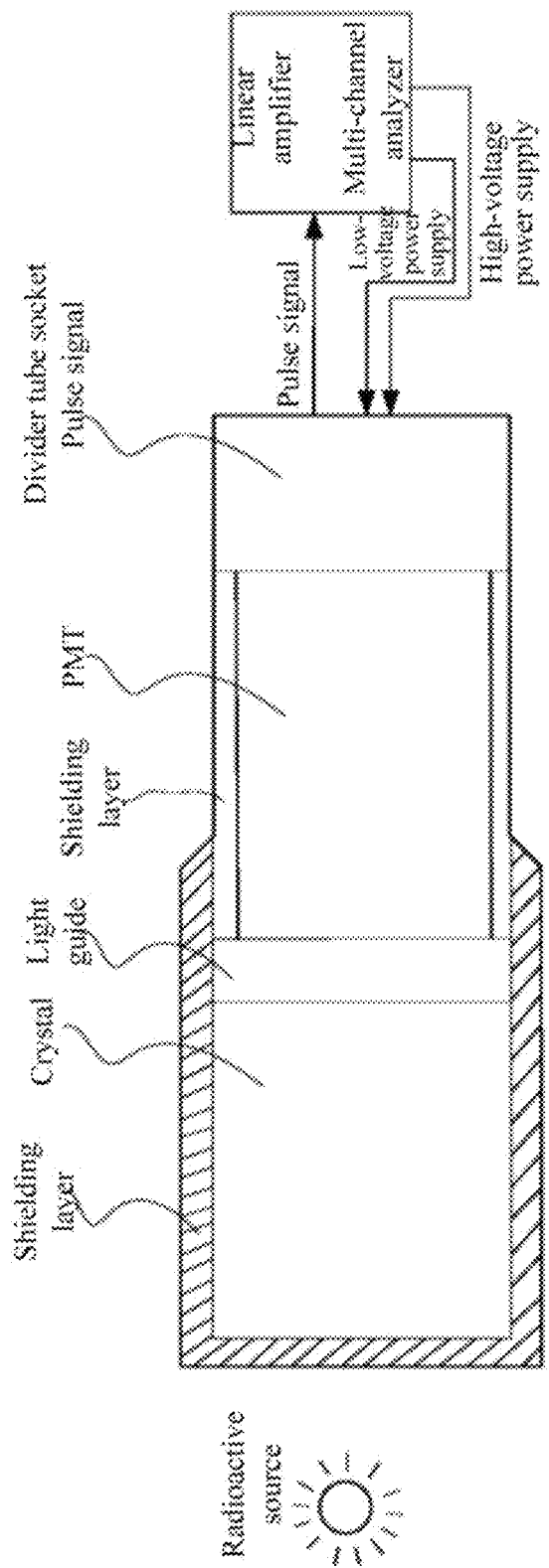
FIG. 11 is a schematic diagram of an internal structure of a detector.
Figure 12:
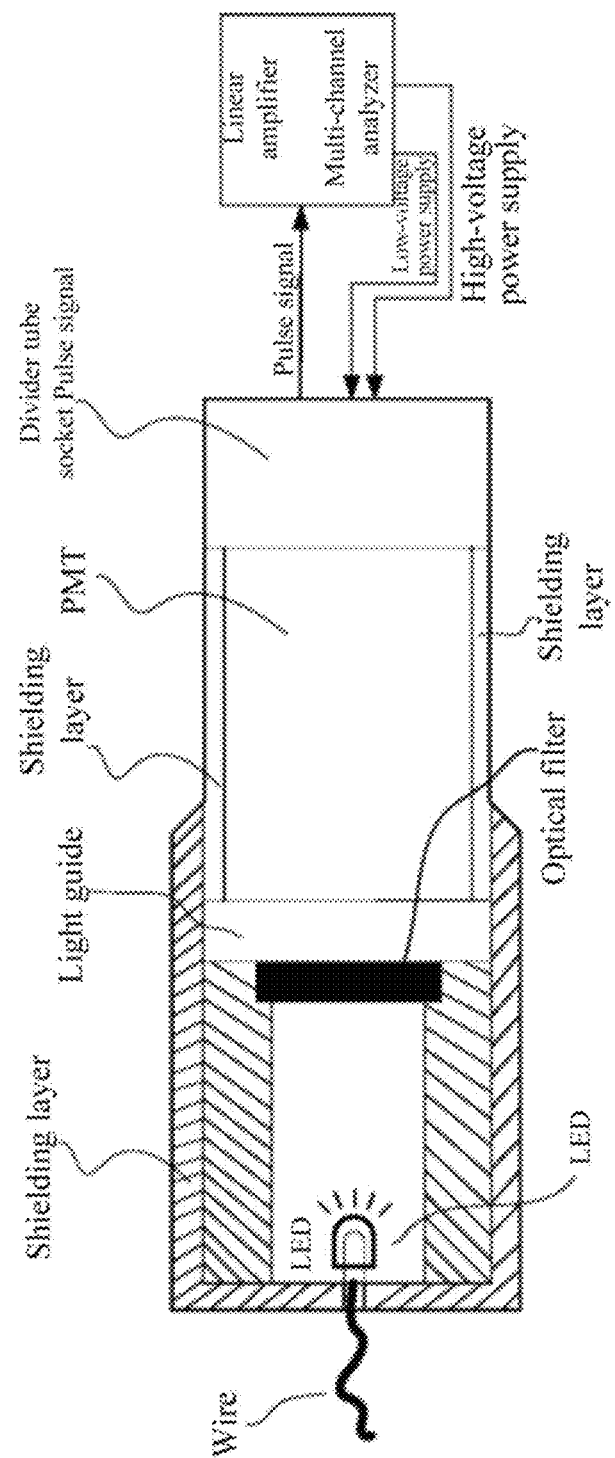
FIG. 12 is a schematic diagram of an internal structure of LED light source design.

The structure of a general NaI detector is shown in FIG. 11. The scintillator is attached to the light guide and the PMT. When the radioactive source is measured, the scintillator receives γ radiation to emit fluorescent photons, which enter the PMT for conversion and amplification of optical signals to electrical signals. The structure of the large LED part of the nuclear detection simulation device based on a nanosecond light source of the present disclosure is shown in FIG. 12. The original scintillator is replaced with an LED lamp to receive γ radiation to emit fluorescent photons, which greatly retains the integrity of the detector.

The present disclosure can simulate the process of point source and area source being detected by the scintillator detector. According to the characteristics of point source or area source and scintillator detector type, the corresponding energy spectrum curve is simulated by Monte Carlo, and the lower computer inverts the energy spectrum curve into random nuclear pulse output.

Figure 15:
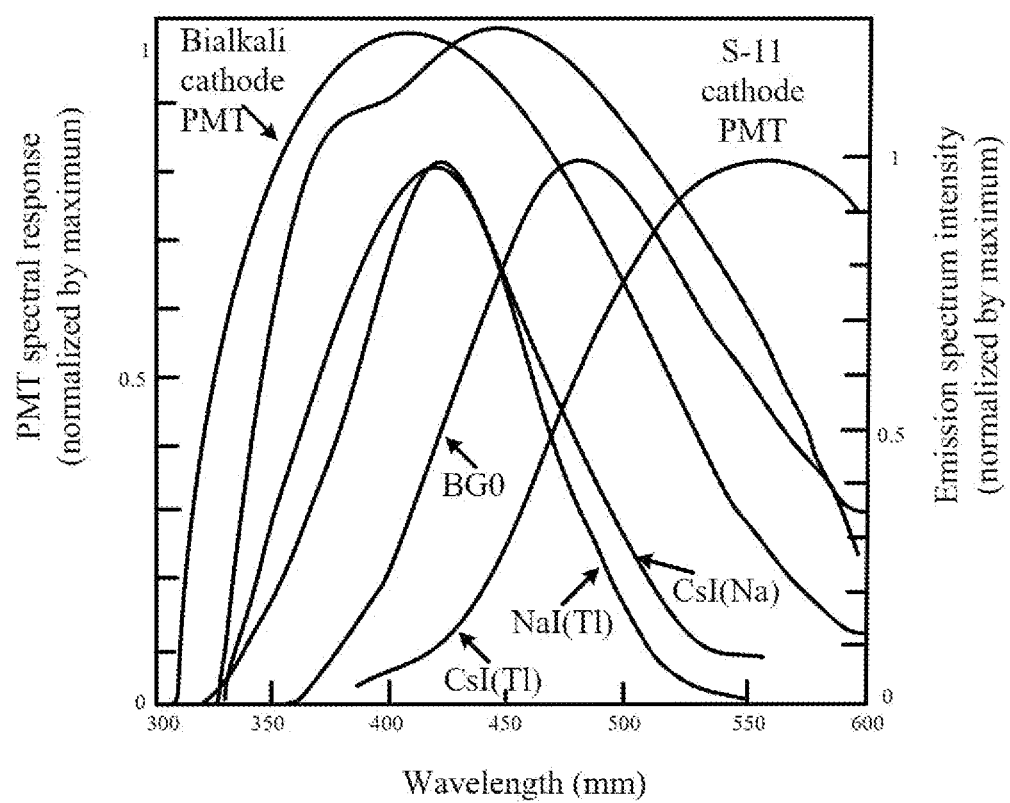
FIG. 15 is a schematic diagram of emission wavelength distribution of a scintillator detector.
Figure 17:
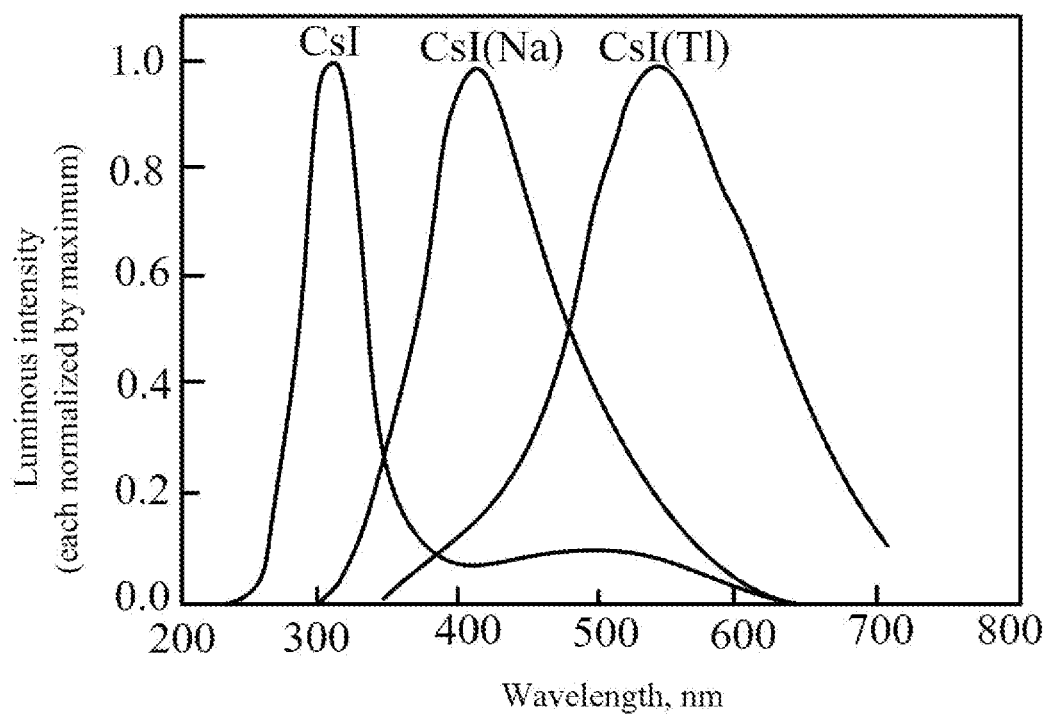
FIG. 17 is a schematic diagram of a continuous spectrum of a wavelength range.
Figure 18:
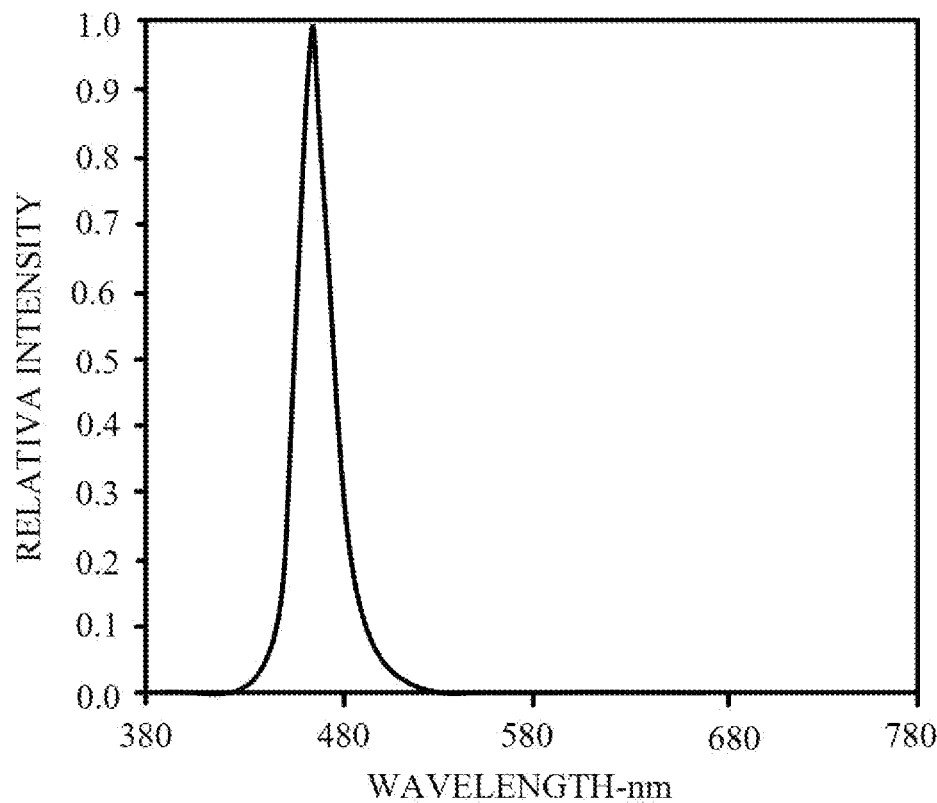
FIG. 18 is a schematic diagram of a luminous wavelength range of a selected LED of the present disclosure.

For a real scintillator, the detection process is as follows: first, the radiation enters the scintillator and loses energy in the scintillator, causing ionization and de-excitation of the scintillator atoms, then the excited atoms are de-excited to emit scintillation photons with wavelengths at or near the visible light, and the scintillator is excited by the radiant particles and emits not monochromatic light but a continuous spectrum with a certain wavelength range, as shown in FIG. 17. Therefore, in order to simulate the radiation emission of the scintillator, the present disclosure uses an electronic circuit to output the nuclear pulse current signal to drive the LED to emit light and generate a nuclear pulse optical signal, and the LED illuminates the PMT to convert the optical signal into an electrical signal. In this way, the simulation of the working process of the scintillator detector is realized. The present disclosure selects a blue LED lamp, as shown in FIG. 18, which shows a luminous wavelength range of the selected LED of the present disclosure. Since the wavelength of the light emitted by the blue LED is within the wavelength continuum range generated by the scintillator detector, and is also in the most sensitive range of the spectral response of the PMT, as shown in FIG. 15, compared with other color LEDs, blue LEDs have less variation in luminous intensity affected by the temperature.

Since different radioactive sources generate different nuclear pulse signals inside the detector, the present disclosure can directly and randomly generate a single nuclear pulse signal in the lower computer according to the mechanism of generating different nuclear pulse signals in different detectors by different radioactive sources. The upper computer only needs to input parameters such as the type of the radioactive source and the type of the detector.

Figure 16:
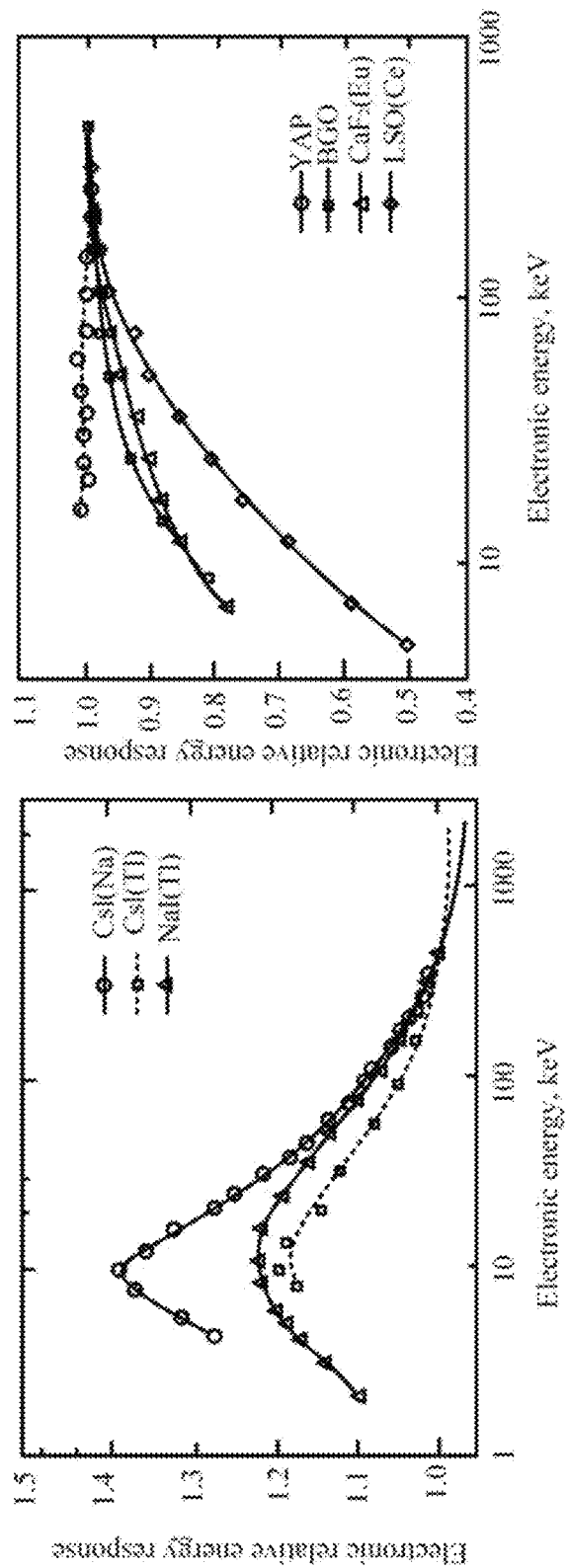
FIG. 16 is a schematic diagram of a relative energy response curve of a traditional scintillator to electrons.

Due to different luminous mechanisms of the scintillators, the scintillators can be divided into organic scintillators and inorganic scintillators, which have different scintillation efficiencies for the same energy, that is, the relative energy responses of electrons are different. As shown in FIG. 16, the scintillation efficiency of inorganic scintillators is generally large, so for this kind of phenomenon, the present disclosure realizes the simulation of differences of scintillation efficiency caused by organic scintillation and inorganic scintillators for the same energy according to different frequencies of nuclear pulse signals randomly output by different types of scintillators under the environment of simulating the same radioactive source.

When the organic scintillator absorbs radiation, in addition to the emission of fluorescent photons, delayed fluorescence that is the same as the fluorescence but delayed in time can also be observed, that is, the scintillation light pulse of the organic scintillator has a fast component and a slow component. In view of this phenomenon, the present disclosure designs and realizes a nuclear pulse with the same characteristics as the fast component when luminescence of the organic scintillator is simulated, and then outputs a nuclear pulse signal conforming to the characteristics of the slow component after a certain time delay. In addition to the difference in output time, the characteristics of fast component and the slow component are different in the rise time, fall time and energy contained in the nuclear pulse signals.

Due to the different types of scintillator detection, the rise time and fall time of the nuclear pulse signal emitted by irradiation are different. Therefore, the present disclosure can output nuclear pulse signals including corresponding rise time and fall time according to different types of scintillator detection.

Although the pulse amplitude output by the scintillator detector is proportional to the energy lost by the incident particles inside the scintillator, due to statistical fluctuations, even for monoenergetic charged particles whose energy is completely lost in the scintillator detector, the output pulse amplitude corresponding to each particle also has statistical fluctuations, such that the pulse amplitude spectrum of the monoenergetic charged particles is approximately in Gaussian distribution, which is one of the reasons for the difference in energy resolution of each scintillator detector. The present disclosure simulates this phenomenon. When the monoenergetic nuclear pulse signal is output, the amplitude of the output nuclear pulse signal will have certain random statistical fluctuation, and the amplitude is in Gaussian random distribution.

The present disclosure can simulate the phenomenon that in the scintillator detector, there are statistical fluctuations in the photons generated by energy deposition and the subsequent photoelectric conversion process, the pulse amplitude corresponding to the monoenergetic charged particles is distributed around the average value to a certain extent, which is reflected in the pulse amplitude spectrum, and the full-energy peak and escape peak are all broadened, and the Compton edge is no longer steep and becomes flat. The method used by the present disclosure is as follows: when the nuclear pulse signal of the same energy is output, the amplitude of the nuclear pulse signal is changed randomly according to the statistical fluctuation characteristics that the ray of this energy is absorbed in the detector and the nuclear pulse signal is output. Statistical fluctuations are in Gaussian distribution.

After the γ ray enters the detector, there are as many as 12 interaction processes with the detector material, but the main ones are the, the Compton effect, and the electron pair effect. When the full energy of the ray is absorbed by the scintillator, the photoelectric effect generates a full-energy peak in the energy spectrum. According to the present disclosure, the photoelectric effect and the full-energy peak can be generated in the detector through Monte Carlo simulation of the corresponding radioactive source, and the full-energy peak can be inverted into the random nuclear pulse signal output in the lower computer.

When the rays enter the detector, Compton scattering may occur, and the present disclosure can use Monte Carlo simulation to realize the Compton scattering of the radioactive source in the scintillator and generate the energy spectrum curve, and the lower computer inverts the energy spectrum curve into the random nuclear pulse signal output to simulate the Compton scattering phenomenon of the radioactive source at one time.

When the energy of γ rays is higher than 1.02 MeV, the electron pair effect may occur with the medium in the detector after the γ rays enter the detector. When the kinetic energy of the positron is completely lost, it is easily annihilated with the colliding negative electron, and then emits two γ rays with energy of 0.511 MeW and opposite directions of motion. At this time, three situations will occur. That is, a double escape peak is generated when neither of the two emitted γ rays interacts with the matter in the detector. When one of the emitted two γ rays interacts with the matter in the detector and is fully absorbed, another ray escapes from the crystal without being detected by the detector, and a single escape peak will be generated. When the two emitted γ rays both interact with the matter in the detector and are fully absorbed, a pulse will be generated at the γ spectral position of the corresponding energy, resulting in a full-energy peak. Based on this theoretical knowledge, the present disclosure realizes a situation that when the energy contained in the generated nuclear pulse signal is greater than 1.02 MeV, the nuclear pulse signal forming the double escape peak, the single escape peak, and the full-energy peak will be randomly generated and output according to the escape ratio relationship of the electron pair.

For the detection of the same detector, if the radioactive sources are different, different nuclear pulse signals will be generated in the detector. The present disclosure can simulate a situation that various radioactive source rays are absorbed in the detector to generate nuclear pulse signals. According to the type of the radioactive source, the present disclosure generates different random nuclear pulse signals with different probabilities of generating nuclear pulse signals with corresponding energy.

The detection efficiency of a scintillator detector mainly depends on the probability of the ray generating secondary electrons in the scintillator, which will be determined by factors such as the interaction cross section of the ray and the scintillator, the size and shape of the scintillator, and the relative position of the source and the detector. Therefore, the present disclosure adjusts the frequency of the output nuclear pulse signal according to factors such as the interaction cross section of the ray and the scintillator, the size and shape of the scintillator, and the relative position of the source and the detector to simulate different detection efficiencies of different scintillator detectors.

Some scintillator detectors, such as LaBr3(Ce) detectors, will have certain radiation and also generate nuclear pulse signals. In view of this phenomenon, the present disclosure generates the corresponding nuclear pulse signal according to the type of scintillator, the situation whether there is radiation, and the characteristics of radiation, that is, the nuclear pulse signal generated by the radiation of the scintillator detector itself can be simulated.

The present disclosure can simulate the pileup of nuclear pulse signals in the detector, and supports up to tenfold pileup.

The present disclosure provides a nuclear detection simulation device based on a nanosecond light source and a nuclear signal inversion technology. The nuclear detection simulation device includes an upper computer, a FPGA SoC processor, a synchronous clock, a DDR3, a SD card (TF-CARD), a LCD screen, and an output channel for a simulated nuclear pulse signal. Electronic circuits and nuclear pulse current signals are used to drive blue LEDs to emit nuclear pulse optical signals, so as to simulate a scintillator to receive γ radiation to emit fluorescent photons. The system can realize the simulation of the detection process of the point source and the area source, can simulate the detection process of organic scintillator detectors and inorganic scintillator detectors, can simulate different scintillation efficiencies and detection efficiencies of different scintillator detectors, simulates the nuclear pulse signal according to the process of radioactive sources being detected, simulates the nuclear pulse signal of the fast components and slow components output in the scintillator detector, can output the nuclear pulse signals containing various rise times, fall times, and amplitudes, simulates the statistical fluctuation phenomenon after the rays are absorbed by the detector and the nuclear pulse signal is output, can also simulate the output of full-energy peaks, single escape peaks, and double escape peaks, can simulate the Compton scattering of the scintillator detector, can simulate the nuclear pulse signal generated by the self-radiation of the scintillator detector, can generate the corresponding energy spectrum curve according to parameters such as the type of the scintillator, the position of the radioactive source, the intensity of the radioactive source, and the type of the radioactive source and invert the output of the nuclear pulse signal, can realize the output of the nuclear pulse signal with up to tenfold pileup, and realizes the generation of Gaussian random numbers, uniform random numbers, and exponentially distributed random numbers in the FPGA. The upper computer can generate the spectral line according to a large amount of experimental data and Monte Carlo simulation, and can simulate and configure the output of various environmental background spectral lines, and realize 3D visualization in the operation process. A nuclear signal detection process of the scintillator detectors can be subjected to animated demonstration. Therefore, the nuclear detection simulation device can not only be used as professional test equipment, but also a teaching instrument suitable for students' teaching.

Finally, it should be noted that the above description is only a preferred embodiment of the present disclosure and is not intended to limit the present disclosure. Although the present disclosure has been described in detail with reference to the foregoing embodiments, those skilled in the art can still modify the technical solutions described in the foregoing embodiments, or equivalently substitute some of the technical features of the embodiments. Any modifications, equivalent substitutions, improvements, and the like within the spirit and principle of the present disclosure should fall within the protection scope of the present disclosure.

What is claimed is:

1. A nuclear signal inversion method of a nuclear detection simulation device based on a nanosecond light source, comprising an upper computer, a ZYNQ SoC processor, a synchronous clock, a double data rate type 3 (DDR3), a secure digital (SD) card TF-CARD, a liquid crystal display (LCD) screen, and an output channel for a simulated nuclear pulse signal, wherein the upper computer is connected to the ZYNQ SoC processor through a 1000 M Ethernet, a USB3.0, and a RS232 respectively; and the synchronous clock, the DDR3, and the SD card are respectively connected to the ZYNQ SoC processor, and the ZYNQ SoC processor is connected to the output channel for the simulated nuclear pulse signal;

the ZYNQ SoC processor comprises a field programmable gate array (FPGA) unit and an advanced RISC machine (ARM) unit, and the FPGA unit is connected to the ARM unit through an AXI bus;

the LCD screen is directly connected to the FPGA unit of the ZYNQ SoC processor through an IO port;

the SD card is connected to the ARM unit of the ZYNQ SoC processor;

the synchronous clock is connected to the FPGA unit and the ARM unit of the ZYNQ SoC processor synchronously to provide the synchronous clock for the FPGA unit and the ARM unit;

the output channel for the simulated nuclear pulse signal comprises a DAC, a current amplifier, an LED, an optical filter, a photomultiplier tube (PMT), and a high-voltage divider tube seat;

the DDR3 is connected to the ARM unit of the ZYNQ;

an input pin of the DAC is connected in parallel to the FPGA unit of the ZYNQ through an IO port;

the current amplifier is connected to an output pin of the DAC;

the LED is connected to an output pin of the current amplifier;

the LED is closely attached to the optical filter;

the optical filter is directly attached to a light-receiving surface of the PMT; and the PMT is connected to a preamplifier; and the nuclear detection simulation device further comprises a power supply, wherein the power supply is respectively connected to the upper computer, the ZYNQ SoC processor, the synchronous clock, the DDR3, the SD card, the LCD screen, and the output channel for the simulated nuclear pulse signal; and method comprises the following steps:

(1) setting, by an upper computer, corresponding parameters according to user-selected functions, then generating an energy spectrum curve with a corresponding statistical fluctuation phenomenon using Monte Carlo simulation and a large amount of real data according to the parameters, and performing animated demonstration of a detection process of a scintillator detector and a spectrometer to a radioactive source;

(2) sending, by the upper computer, a spectral line and the set parameters to a ZYNQ SoC processor, or pre-storing the spectral line in a SD card;

(3) inverting, by an ARM unit of the ZYNQ SoC processor, the spectral line into amplitude information of a series of random nuclear pulse signals; or when simulation of the radioactive source is selected, directly generating, by the ZYNQ SoC processor, amplitude information of a series of random nuclear pulse conforming to characteristics of the radioactive source;

(4) determining, by the ARM unit of the ZYNQ SoC processor, whether fast components and slow components are contained, and whether the self-radiation and the electron pair effect are generated according to a type of a scintillator, and generating a series of random nuclear pulse signal sequence data containing different rise times, fall times, and amplitudes according to a calculated proportional relationship of the contained fast components and slow components and self-radiated nuclear pulse signals combined with the amplitude information of the random nuclear pulse;

(5) sending, by the ARM unit of the ZYNQ SoC processor, data to an FPGA unit;

(6) generating, by the FPGA unit, a uniform random number according to the data, and then generating an exponentially distributed random number according to the uniform random number as an output time interval of each nuclear pulse signal;

(7) adjusting the output time interval according to scintillation efficiency and detection efficiency of the scintillator detector;

(8) since the FPGA unit is equipped with a counter, when a value of the counter is equal to the time interval, outputting nuclear pulse digital signals sequentially according to a nuclear pulse signal sequence, and when the time interval is less than a pulse width of the nuclear pulse signals, outputting piled-up nuclear pulse signals, wherein up to tenfold pileup is capable of being achieved; and (9) converting the nuclear pulse digital signals into simulated nuclear pulse signals through a DAC, then amplifying the simulated nuclear pulse signals through a current amplifier to drive an LED to output nuclear pulse optical signals, illuminating a PMT by the optical signals after attenuation by an optical filter, converting the optical signals into electrical signals by the PMT, and then outputting the electrical signals from an anode.

2. The nuclear signal inversion technology of the nuclear detection simulation device based on a nanosecond light source according to claim 1, wherein in step (1), the animated demonstration comprises a process of generating fluorescent photons after γ rays are absorbed by the scintillator detector, a process of converting the fluorescent photons into electrical signals by the PMT and performing multi-stage amplification, signal changes after passing through a preamplifier, and a process of how a spectrometer extracts information contained in the signal output by the preamplifier.

3. The nuclear signal inversion method of the nuclear detection simulation device based on a nanosecond light source according to claim 1, wherein in step (1), the user-selected functions comprise simulation of the type of the scintillator, simulation of relative positions of the radioactive source and the detector, simulation of the intensity of the radioactive source, simulation of the type of the point or area source radioactive source, simulation of the activity of the radioactive source, simulation of the photoelectric effect, simulation of Compton scattering, simulation of the electron pair effect, simulation of the scintillation efficiency of the scintillator, simulation of the detection efficiency of the scintillator detector, simulation of an environmental background, simulated output of full-energy peaks, single escape peaks, and double escape peaks, simulation of the nuclear pulse signal of the fast components and slow components output in the scintillator detector, simulated output of nuclear pulse signals containing various rise times, fall times, and amplitudes, and simulation of the statistical fluctuation phenomenon after the rays are absorbed by the detector and the nuclear pulse signal is output.

\* \* \* \* \*